(12) United States Patent
Bourne et al.

(10) Patent No.: US 10,392,103 B2
(45) Date of Patent: Aug. 27, 2019

(54) DETACHABLE POWER TRANSFER DEVICE FOR A ROTARY-WING AIRCRAFT

(71) Applicant: Sikorsky Aircraft Corporation, Stratford, CT (US)

(72) Inventors: Frederick L. Bourne, Litchfield, CT (US); Peter James Waltner, Royal Palm Beach, FL (US); Simon Gharibian, Killingworth, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 171 days.

(21) Appl. No.: 15/360,116

(22) Filed: Nov. 23, 2016

(65) Prior Publication Data

US 2017/0158354 A1 Jun. 8, 2017

Related U.S. Application Data

(60) Provisional application No. 62/263,162, filed on Dec. 4, 2015.

(51) Int. Cl.
| | |
|---|---|
| *B64C 27/04* | (2006.01) |
| *B64C 39/02* | (2006.01) |
| *B64D 27/24* | (2006.01) |
| *B64F 1/36* | (2017.01) |
| *B64F 3/02* | (2006.01) |
| *B64D 27/02* | (2006.01) |

(52) U.S. Cl.
CPC ............ *B64C 27/04* (2013.01); *B64C 39/024* (2013.01); *B64D 27/24* (2013.01); *B64F 1/36* (2013.01); *B64C 39/022* (2013.01); *B64C 2201/027* (2013.01); *B64C 2201/088* (2013.01); *B64C 2201/12* (2013.01); *B64C 2201/148* (2013.01); *B64D 2027/026* (2013.01); *B64F 3/02* (2013.01)

(58) Field of Classification Search
CPC ...................................................... B64C 27/04
USPC ........................................................ 320/109
See application file for complete search history.

(56) References Cited

U.S. PATENT DOCUMENTS

| | | | |
|---|---|---|---|
| 2,440,758 A | 5/1948 | Pitcairn | |
| 8,948,928 B2 | 2/2015 | Alber et al. | |
| 9,630,712 B1* | 4/2017 | Carmack | ............... B64C 39/024 |
| 10,011,352 B1* | 7/2018 | Dahlstrom | ............ B64C 39/022 |
| 2003/0136874 A1* | 7/2003 | Gjerdrum | .............. B64D 39/00 244/10 |
| 2005/0151001 A1* | 7/2005 | Loper | ..................... B64C 27/14 244/6 |
| 2013/0233964 A1* | 9/2013 | Woodworth | ............ B64C 37/02 244/2 |
| 2014/0316608 A1* | 10/2014 | Alber | .................... B64C 39/022 701/2 |
| 2017/0043872 A1* | 2/2017 | Whitaker | ................. B64D 1/18 |

\* cited by examiner

*Primary Examiner* — Jerry D Robbins
(74) *Attorney, Agent, or Firm* — Cantor Colburn LLP

(57) ABSTRACT

A detachable power transfer device for a rotary-wing aircraft includes a docking station integrated into the rotary-wing aircraft. A power pod of the detachable power transfer device is constructed and arranged to detachably connect to the docking station for transferring power to the rotary-wing aircraft.

13 Claims, 4 Drawing Sheets

DETACHABLE POWER TRANSFER DEVICE FOR A ROTARY-WING AIRCRAFT

CROSS-REFERENCE TO RELATED APPLICATIONS

The present application claims priority to U.S. Provisional Application No. 62/263,162, filed on Dec. 9, 2015, the contents of which are incorporated by reference herein in their entirety.

BACKGROUND

The present disclosure relates to a rotary-wing aircraft, and more particularly, to detachable power transfer device for a rotary-wing aircraft.

The propulsion systems of rotary-wing aircraft may include combustion engines such as gas turbine engines, electrical propulsion system and hybrid systems which may be a combination of various propulsion technologies. During operation, rotary-wing aircraft may require greater power (i.e., RPM and torque) during take-off and landing procedures, as opposed to cruising speed. To provide this additional power the various power systems may be designed to be larger than what would otherwise be required for cruising speeds. This additional size may contribute toward manufacturing cost and aircraft weight. It is desirable to improve operational efficiency and reliability of today's rotary-wing aircraft, and to further reduce manufacturing cost.

SUMMARY

A detachable power transfer device for a rotary-wing aircraft according to one, non-limiting, embodiment of the present disclosure includes a docking station attached to the rotary-wing aircraft; and a power pod constructed and arranged to detachably connect to the docking station for transferring power to the rotary-wing aircraft.

Additionally to the foregoing embodiment, the detachable power transfer device includes at least one umbilical cord configured to transfer power with respect to the power pod.

In the alternative or additionally thereto, in the foregoing embodiment, the power transferred is electrical power.

In the alternative or additionally thereto, in the foregoing embodiment, the power pod is configured to convert electrical power to mechanical power, and wherein the mechanical power is transferred to the rotary-wing aircraft through the docking station.

In the alternative or additionally thereto, in the foregoing embodiment, the power pod includes an unmanned aerial vehicle.

In the alternative or additionally thereto, in the foregoing embodiment, the power pod includes an electrical plug configured to mate with the docking station.

In the alternative or additionally thereto, in the foregoing embodiment, the rotary-wing aircraft is a hybrid helicopter.

In the alternative or additionally thereto, in the foregoing embodiment, the power transferred comprises at least one of electrical, mechanical, and hydraulic power.

In the alternative or additionally thereto, in the foregoing embodiment, the power pod includes at least one electric battery.

In the alternative or additionally thereto, in the foregoing embodiment, the rotary-wing aircraft is an electric helicopter.

In the alternative or additionally thereto, in the foregoing embodiment, the detachable power transfer device includes an electric controller configured to facilitate at least one of an engagement and a disengagement of the power pod in response to one or more of an aircraft state parameter, ambient conditions, and pilot command.

A method of operating a rotary-wing aircraft according to another, non-limiting, embodiment includes connecting a power pod to a docking station carried by the rotary-wing aircraft; transferring power from the power pod to the rotary-wing aircraft during at least one of take-off, landing, and hovering; and disengaging the power pod from the docking station after completion of at least one of the take-off, landing, and hovering.

Additionally to the foregoing embodiment, the method includes transferring electrical power through an umbilical cord and to the power pod.

In the alternative or additionally thereto, in the foregoing embodiment, the method includes converting electrical power transferred by the umbilical cord to mechanical power by the power pod and transferring the mechanical power to the rotary-wing aircraft.

In the alternative or additionally thereto, in the foregoing embodiment, the method includes operating an unmanned aerial vehicle of the power pod after disengagement to land the power pod.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
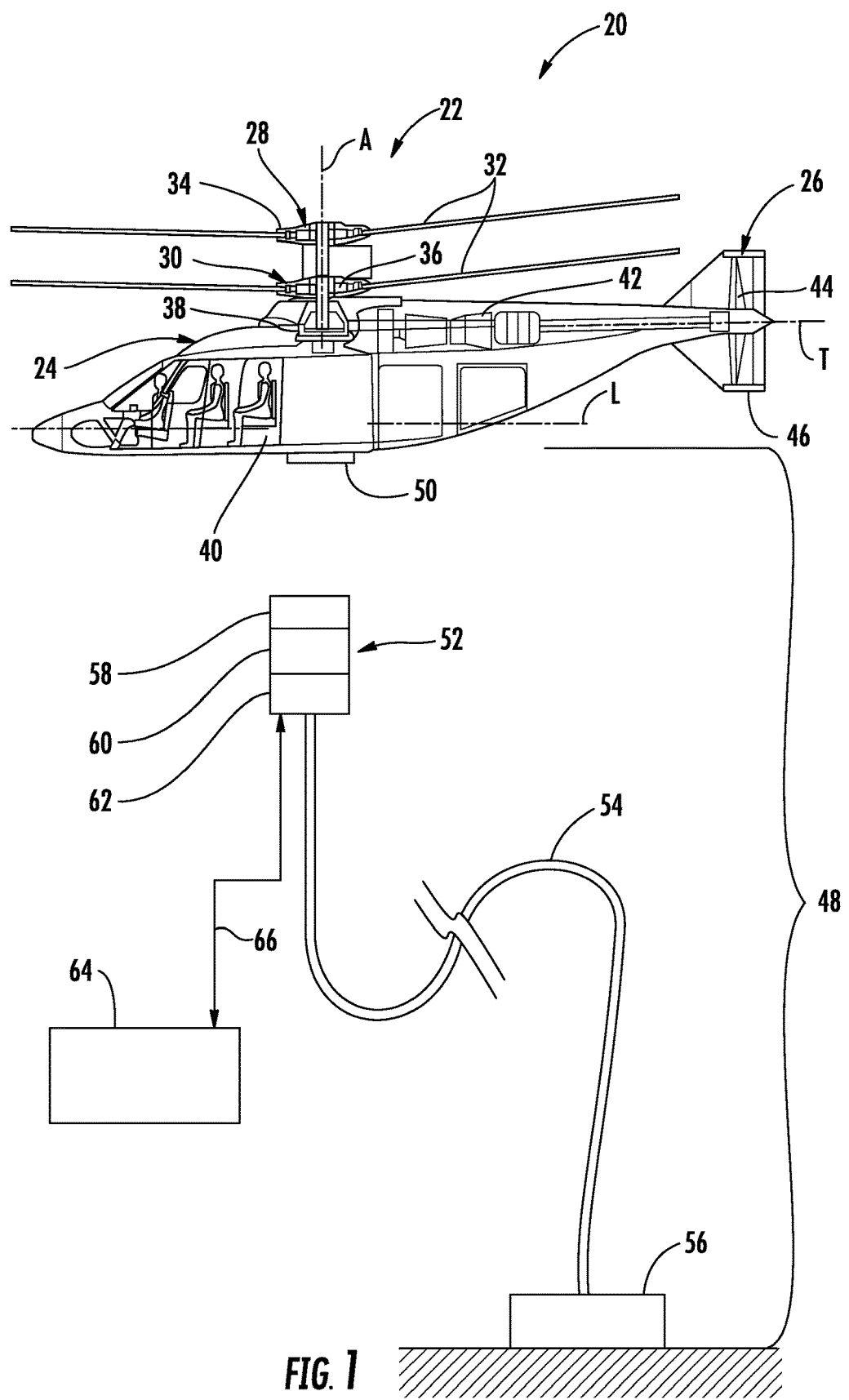
FIG. 1 is a schematic of a rotary-wing aircraft aligned to a detachable power transfer device according to one non-limiting, exemplary, embodiment of the present disclosure.

Referring to FIG. 1, an exemplary vertical takeoff and landing (VTOL) rotary-wing aircraft 20 is illustrated. The rotary-wing aircraft 20 includes a rotor system 22 that rotates about a rotational axis A, an airframe 24 and an optional translational thrust system 26. The rotor system 22 may be a dual, counter-rotating, coaxial rotor system, and is supported by the airframe 24. The translational thrust system 26 provides translational thrust generally parallel to a longitudinal axis L of the rotary-wing aircraft 20. Although a particular aircraft configuration is illustrated in the disclosed embodiment, other rotary-wing aircraft (e.g., both manned and unmanned) will also benefit from the present disclosure.

The rotor system 22 may include an upper rotor assembly 28 and a lower rotor assembly 30. Each rotor assembly 28, 30 includes a plurality of rotor blades 32 mounted to respective rotor hubs 34, 36 for rotation about axis A. The rotor blades 32 project substantially radially outward from the hubs 34, 36, are circumferentially spaced from one-another, and are connected thereto in any manner known to one of ordinary skill in the art. Any number of rotor blades 32 may be applied to the rotor system 22.

A main gearbox 38 adapted to drive the rotor system 22 may be generally supported by and located in the airframe 24 and above an aircraft cabin 40 of the airframe. The translational thrust system 26 may also be driven by the same main gearbox 38. The main gearbox 38 may be driven by one or more propulsion systems 42 that may be gas turbine engines. Generally, the main gearbox 38 may be interposed between the engine(s) 42, the rotor system 22 and the translational thrust system 26. Alternatively, the propulsion system 42 may generally be electric motor(s) that may drive the upper and lower rotor assemblies 28, 30 via the main gearbox 38, or the motors may be an integral part of the upper and lower hubs 34, 36. It is further contemplated and understood that the propulsion system 42 may be any type of hybrid systems including system that apply a combination of electrical and combustion technologies.

The translational thrust system 26 may be adapted to provide thrust for high-speed flight, and may include a pusher propeller 44 mounted within an aerodynamic cowling 46 of the thrust system. The translational thrust system 26 may be mounted to the rear of the airframe 24, with the propeller 44 configured to rotate about an axis T that is orientated substantially horizontal and parallel to the aircraft longitudinal axis L.

More specifically to the present disclosure, a detachable power transfer device 48 may provide supplemental power to the propulsion system 42 of the rotary-wing aircraft 20 during flight conditions that typically require greater power than, for example, normal cruising speeds. Such flight conditions may include take-off and landing operations that typically require greater power of the rotor system 22. The power transfer device 48 may include a docking station 50, a power pod 52, an umbilical cord or tether 54 and a power source 56. The docking station 50 may be fixed or integrated into the airframe 24 of the aircraft 22. The power pod 52 is constructed and arranged to detachably connect to the docking station 50.

The umbilical cord 54 may extend between the power pod 52 and the power source 56 for transferring power from the power source 56 to the power pod 52. With regard to aircraft take-off conditions, the length of the umbilical cord 54 is sufficiently long to permit the rotary-wing aircraft 20 to rise to a take-off decision point (TDP) elevation before detaching. With regard to aircraft landing conditions, the length of the umbilical cord 54 is sufficiently long to permit the power pod 52 to attach to the airframe 24 generally before landing operations commence.

The power source 56 may generally be fixed and/or proximate to the landing pad or strip for the rotary-wing aircraft 20. For example, the power source 56 may be fixed to a ship, an aircraft carrier, or a land-based environment. Depending at least in-part upon the type of propulsion system 42 of the rotary-wing aircraft 20, the power outputted by the power source 56 and transferred through the umbilical cord 54 to the power pod 52 may be in the form of electrical power, hydraulic power and others.

The power pod 52 may include a detachable plug 58, a power converter 60 and an unmanned aerial vehicle 62. The plug 58 is detachably engaged to the docking station 50. For example, a mechanical device (not shown) may be carried between the plug 58 and the docking station 50 that is configured to engage and disengage upon command. A controller 64, which may be electronic, may be remotely located (e.g., in the aircraft cockpit or proximate to the power source 56) and configured to send a command signal 66 to the power pod 52 to engage to, or disengage from, the docking station 50. Alternatively, the controller 64 may send a signal to the docking station 50 instructing the station to engage and/or disengage with respect to the power pod 52. The command signal(s) may be wireless or the signals may be sent over at least one hardwired pathway routed, for example, through the umbilical cord 54.

In one example, the power converter 60 of the power pod 52 may be configured to convert electrical energy/power received over the umbilical cord 54 (and from the power source 56) to mechanical power. Although not shown, the docking station 50 may receive this mechanical energy through a rotating spline connection between the docking station 50 and the plug 58. This connection may then be mechanically connected to, for example, the main gear box 38. Alternatively, the power converter 60 may be an energy storage module. For example, the module 60 may be at least one battery for storing electrical energy, or may be a coiled apparatus for storing mechanical or kinetic energy. If the converter 60 is a storage module, the power transfer device 48 may not include the umbilical cord 54 and may not need the power source 56. Alternately, the module 60 may be a power-plant (e.g. a turbine engine, internal combustion engine, fuel cell or the like) which converts chemical energy to electrical or mechanical energy which is then transferred to the rotary-wing aircraft 20. If the converter 60 is a power-plant, the power transfer device 48 may not include the umbilical cord 54 and may not need the power source 56.

The unmanned aerial vehicle 62 of the power pod 52 may be configured to return the power pod 52 back, for example, to the landing pad and after disengagement during a take-off flight condition. This power pod return capability preserves the power pod for reuse and protects against a free-fall scenario when the supplemental power provided by the power pod 52 is no longer needed. Other systems such as a parachute deployment are also contemplated for protecting the power pod 52 from such a free-fall scenario. Yet further and during a landing condition, the unmanned aerial vehicle 62 may be configured to raise and bring the power pod 52 to the rotary-wing aircraft 20. The unmanned aerial vehicle 62 may be controlled by the controller 64 and over, for example, the wireless command signals 66.

Figure 2:
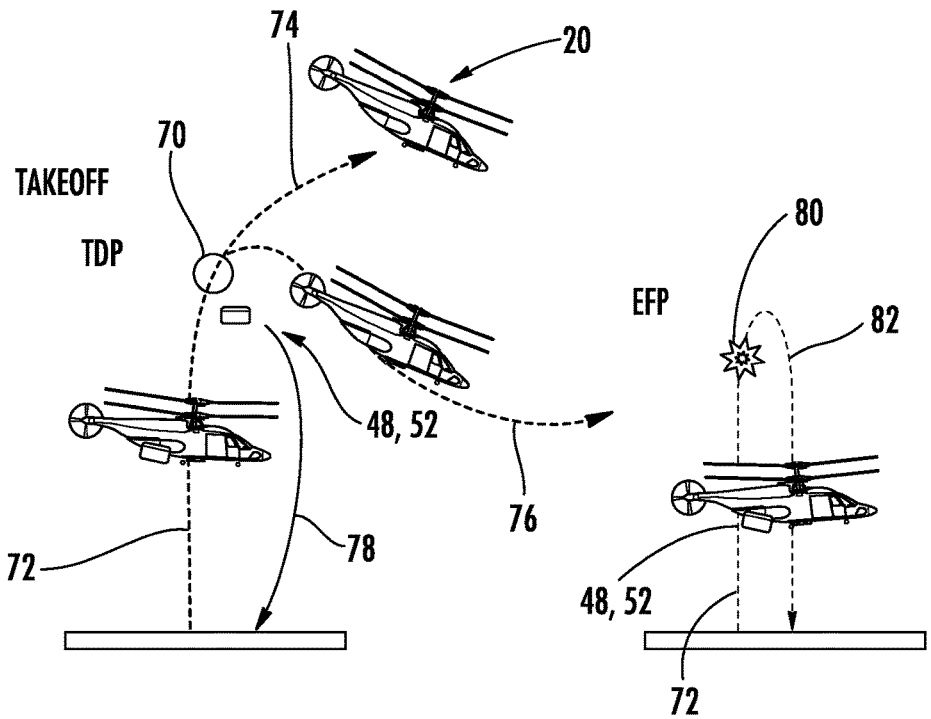
FIG. 2 is a scene of the rotary-wing aircraft taking-off with the detachable power transfer device.

Referring to FIGS. 1 and 2 and during take-off flight conditions, the rotary-wing aircraft 20 may receive supplemental power and begin rising along a takeoff path 72 with the power pod 52 coupled to the docking station 50. In this usage case, the power pod may provide supplemental power for the takeoff while the rotary-wing aircraft 20 is operating normally, and may also provide power in the event of an engine failure while the power pod 52 remains attached. When the rotary-wing aircraft 20 reaches the takeoff decision point (TDP) 70, (and before the umbilical cord 54 becomes taught for embodiments that include an umbilical cord 54) the power pod 52 may be disengaged and the rotary-wing aircraft 20 may continue the takeoff along the normal takeoff path 74, and subsequently begin cruising conditions without the excess weight of the power pod 52. If the power pod 52 is equipped with the unmanned aerial vehicle 62, the controller 64 may control the unmanned aerial vehicle 62 for the controlled and safe return of the power pod 52 to the landing pad.

It is further contemplated and understood that the conditions for detachment may vary and may be dependent upon aircraft state parameters, ambient conditions, aircraft gross weight, pilot command, and other conditions. Furthermore, if the rotary-wing aircraft 20 sustains an engine failure after reaching TDP 70, the aircraft may have sufficient energy to safely fly-away along the continued takeoff flight path 76. Yet further, if the rotary-wing aircraft 20 sustains an engine failure at an engine failure point (EFP) 80 along takeoff path 72 prior to reaching the TDP 70 elevation, the power pod 52 may provide sufficient supplemental power that allows the rotary-wing aircraft 20 to safely return to the landing surface along the rejected takeoff flight path 82. For embodiments where the power pod 52 has sufficient power delivery capability, returning to the landing surface along the rejected takeoff flight path 82 after, for example, sustaining an engine failure along the takeoff path 72 prior to TDP 70 may be unnecessary and the rotary-wing aircraft 20 may be guaranteed the ability to reach a safe height and execute a fly-away along the continued takeoff path 76. Such a capability may be beneficial for situations where rejecting back to the landing surface with, for example, a failed engine has a higher risk than flying to an alternate landing site (e.g., an airport) where the aircraft 20 could execute a single engine landing at or above translational lift speed. As such the power-pod 52 may provide additional safety, gross weight capability, and flexibility for rotary-wing takeoffs.

Figure 3:
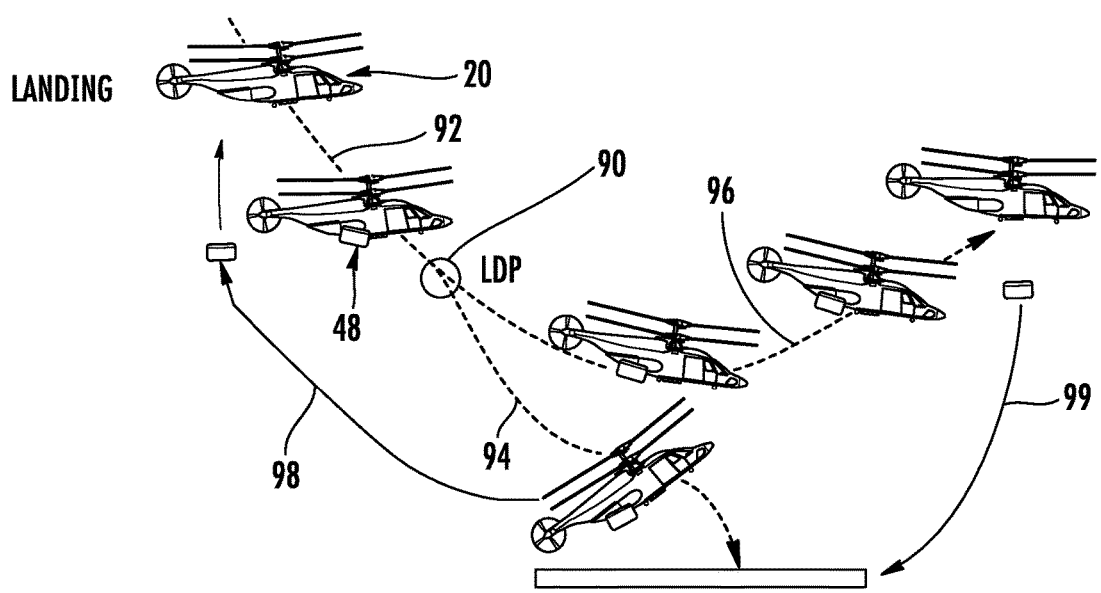
FIG. 3 is a scene of the rotary-wing aircraft landing with the detachable power transfer device.

Referring to FIGS. 1 and 3 and during landing flight conditions, the power pod 52 may approach the rotary-wing aircraft 20 along path 98 and dock with the rotary-wing aircraft 20 prior to or while approaching along approach path 92. In this usage case, the power pod 52 may provide supplemental power for the landing while the rotary-wing aircraft 20 is operating normally and may also provide power in the event of an engine failure while the power pod 52 remains attached. After reaching the landing decision point (LDP) 90 along approach path 92, the rotary-wing aircraft 20 is committed to land. With the power pod 52 attached, in the event of an engine failure subsequent to the LDP 90 along final landing path 94, the power pod 52 may provide supplemental power such that the landing may be executed safely and without undue pilot skill. With a power pod 52 of sufficient power delivery capability, the final landing path 94 may be executed the same, whether or not an engine failure has occurred, anywhere along the approach path 92 or the final landing path 94. In the event of a balked landing, wherein the aircraft flies along balked landing path 96, the power pod 52 may provide additional power until such time as it is no longer needed and may be detached and return to the landing surface along return path 99. Additionally, the power pod 52 may be configured to provide additional power for normal operations for additional gross weight capability and its landing use case need not be limited to recovering from engine failures.

Figure 4:
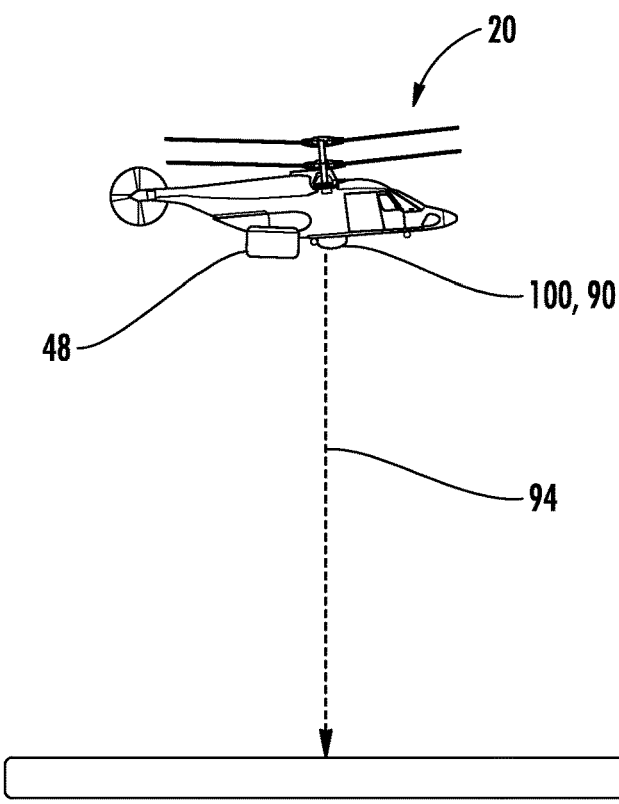
FIG. 4 is a scene of the rotary-wing aircraft landing with the detachable power transfer device.

Referring to FIGS. 1 and 4 and during landing flight conditions, the power pod 52 may hover generally over the landing pad awaiting the arrival of the rotary-wing aircraft 20 to begin landing maneuvers. The power pod 52 (and in mid-air) may engage to the docking station 50 as generally controlled and commanded via the controller 64. Once engaged, the power pod 52 may transfer supplemental power to the rotary-wing aircraft 20 for landing. It is understood that the hover point 100 may be high enough such that the rotary-wing aircraft 20 may execute an emergency fly-away maneuver in the event of an engine failure prior to engaging with the power pod 52, and the power pod 52 may maintain safe separation from the potential fly-away recovery profile. The supplemental power provided by the power pod 52 to the rotary-wing aircraft 20 may facilitate landing of the aircraft 20 along the final landing path 94, and descending from hover point 100 that is substantially coincident with the LDP 90 for this usage case.

Figure 5:
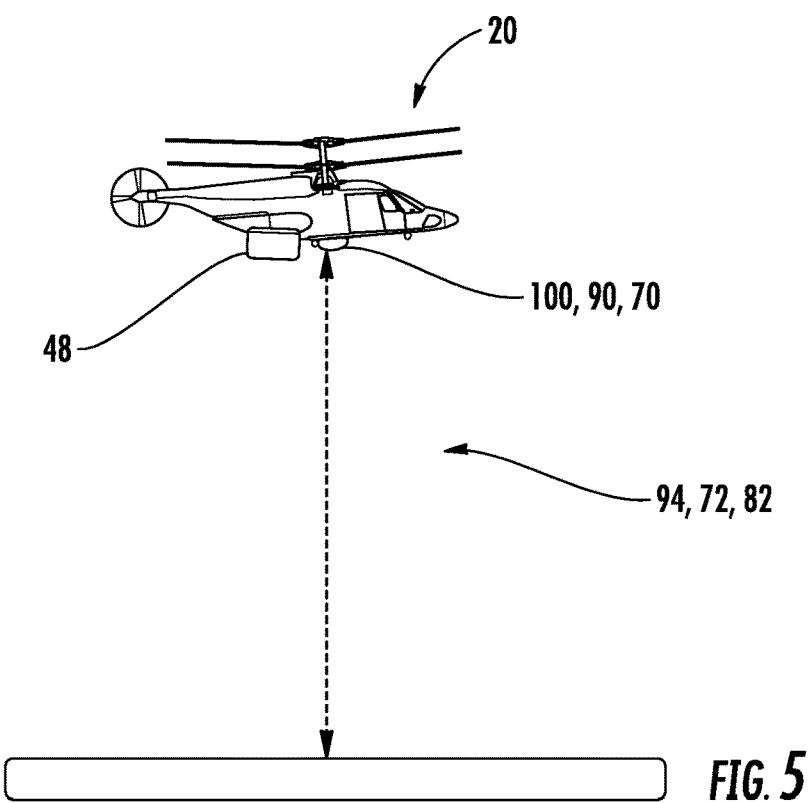
FIG. 5 is a scene of the rotary-wing aircraft hovering with the detachable power transfer device.

Referring to FIGS. 1 and 5, and during a takeoff and/or sentry mission, the power pod 52 may be attached to the rotary-wing aircraft 20 and may allow the aircraft 20 to safely transition between the landing surface and hover point 100 in a manner similar to that described in FIG. 2 and FIG. 4. Additionally, the power pod 52 may facilitate the extended duration operations of rotary-wing aircraft 20 at the hover point 100 without depleting onboard energy stores. As such, the rotary-wing aircraft 20 may depart for a mission from the hover point 100 with more energy stores than would otherwise be available without the use the power pod 52. Upon departing on a mission from hover point 100, if the power pod 52 is equipped with the unmanned aerial vehicle 62, the controller 64 may control the unmanned aerial vehicle 62 for the controlled and safe return of the power pod 52 to the landing pad.

Figure 6:
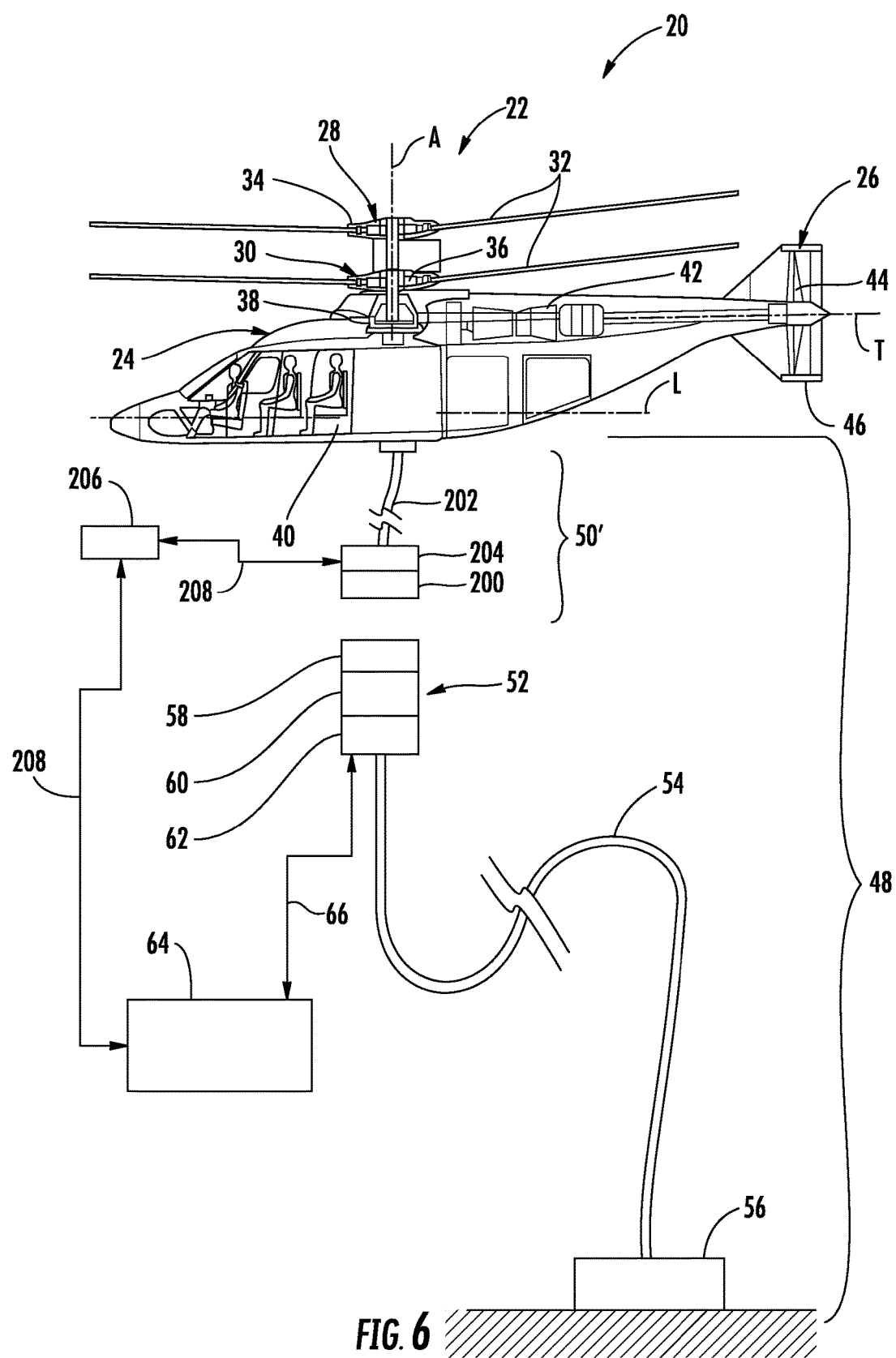
FIG. 6 is a schematic of the rotary-wing aircraft aligned to a detachable power transfer device having a second embodiment of a docking station.

Referring to FIG. 6 with continuing reference to FIG. 1, a second embodiment of a docking station is illustrated wherein like elements to the first embodiment have like identifying numerals except with the addition of a prime symbol as a suffice. A docking station 50' may include a remote or free station 200, an umbilical 202, an unmanned aerial vehicle 204 and a controller 206. The free station 200 and the aerial vehicle 204 may generally form a pod that may be tethered to the aircraft by the umbilical 202.

The docking station umbilical 202 transmits power (e.g. electrical, mechanical, hydraulic, or other) between the station 200 and the airframe 24. The docking station umbilical 202 may be flexible or rigid as appropriate for the application and form of power being transmitted through docking station umbilical 202. Airframe 24 may incorporate a reeling or retraction device (not shown) which may retract the docking station umbilical 202, the aerial vehicle 204 and the station 200 into or flush with the airframe 24. Therefore, the length of umbilical 202 that extends outside of airframe 24 may be variable. A retraction device may also be used to rotate rigid docking station umbilical 202, which may also be described as a boom, between a deployed and stowed state.

It is further contemplated and understood a ground-based reeling device (not shown) may be proximate to the power source 56 that controls the length of the tether 54. The docking station umbilical 202 and docking station 200 facilitate the docking action of power pod 52 to station 200 of the docking station 50' to occur at some distance away from the airframe 24 and thus may enhance safety. Additionally, the docking station umbilical 202 and station 200 may enable power transfer device 48 configurations wherein the power pod 52 remains proximate to the takeoff/landing surface or on the ground.

Unmanned aerial vehicle 204, controller 206, and associated command and communication signals 208 operate in a manner similar to unmanned aerial vehicle 62, controller 64, and command signal 66; however, they serve to control the positon of the free station 200. The addition of unmanned aerial vehicle 204 facilitates additional flexibility in operations and may enhance safety. For instance, it is conceived that a rotary-wing aircraft 20 may hover next to an elevated platform, deploy the free station 200, and use the unmanned aerial vehicle 204 to fly the free station 200 to the elevated platform wherein the free station 200 docks with the power pod 52 on the platform. The aircraft may then transition safely to the elevated platform for landing with supplemental power being provided through the umbilical 202 of the docking station 50' to assist with overcoming emergencies such as engine failures as the aircraft transitions across the helideck edge. The opposite sequence may be used for takeoffs from an elevated platform. Current procedures to cross the helideck edge are generally dynamic and this embodiment allows for more controlled takeoff and landing procedures.

Additionally, for embodiments of power transfer device 48 that incorporate both the controller 64 and the controller 206, these controllers may communicate via command and communication signals 208 to coordinate control of unmanned aerial vehicle 62 and unmanned aerial vehicle 204. Further, controller 64 and controller 206 may be the same device.

Benefits of the detachable power transfer device 20 provide for a lighter aircraft during cruising speeds since batteries, or larger propulsion systems, are not required to be carried by the aircraft. A lighter aircraft improves operating efficiency.

Additionally, for brevity and clarity, the present disclosure was described with respect to the rotary-wing aircraft 20. It is readily apparent that a detachable power pod which is capable of providing supplemental power to an aircraft (fixed wing, rotary-wing, or other type of aircraft) during takeoff and then flying itself back to a landing zone, as well as a power pod capable of flying itself up to and docking with an aircraft to provide supplemental power for landing would provide similar benefits as to those described herein for a rotary-wing aircraft 20.

While the present disclosure is described with reference to exemplary embodiments, it will be understood by those skilled in the art that various changes may be made and equivalents may be substituted without departing from scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A detachable power transfer device for a rotary-wing aircraft comprising:
   a docking station including at least a mechanical power connector attached to the rotary-wing aircraft; and
   a power pod constructed and arranged to detachably connect to the docking station for transferring power to the rotary-wing aircraft, the power pod being configured to convert electrical energy into mechanical power that is transferred to the rotary-wing aircraft through the mechanical power connector during at least one of take-off, landing, and hovering.

2. The detachable power transfer device set forth in claim 1 further comprising:
   at least one umbilical cord configured to transfer power with respect to the power pod.

3. The detachable power transfer device set forth in claim 2, wherein the power transferred from the power pod to the rotary-wing aircraft further includes electrical power.

4. The detachable power transfer device set forth in claim 1, wherein the power pod includes an unmanned aerial vehicle.

5. The detachable power transfer device set forth in claim 3, wherein the power pod includes an electrical plug configured to mate with the docking station.

6. The detachable power transfer device set forth in claim 3, wherein the rotary-wing aircraft is a hybrid helicopter.

7. The detachable power transfer device set forth in claim 1, wherein the power transferred comprises at least one of electrical, mechanical, and hydraulic power.

8. The detachable power transfer device set forth in claim 1, wherein the power pod includes at least one electric battery.

9. The detachable power transfer device set forth in claim 3, wherein the rotary-wing aircraft is an electric helicopter.

10. The detachable power transfer device set forth in claim 1 further comprising:
    an electric controller configured to facilitate at least one of an engagement and a disengagement of the power pod in response to one or more of an aircraft state parameter, ambient conditions, and pilot command.

11. A method of operating a rotary-wing aircraft comprising:
    connecting a power pod to a docking station including a mechanical power connector carried by the rotary-wing aircraft;
    converting electrical power into mechanical power at the power pod;
    transferring the mechanical power from the power pod to the rotary-wing aircraft during at least one of take-off, landing, and hovering; and
    disengaging the power pod from the docking station after completion of at least one of the take-off, landing, and hovering.

12. The method set forth in claim 11 including:
    transferring electrical power through an umbilical cord and to the power pod.

13. The method set forth in claim 11 including:
    operating an unmanned aerial vehicle of the power pod after disengagement to land the power pod.

* * * * *